L. Miller.
Harvester Rake.

N° 84432. Patented Nov. 24, 1868.

Witnesses.
Edwin J. McLean
Jos. D. Patten

Inventor.
Lewis Miller
By Atty A. B. Stoughton

UNITED STATES PATENT OFFICE.

LEWIS MILLER, OF AKRON, OHIO.

IMPROVEMENT IN HARVESTERS.

Specification forming part of Letters Patent No. 84,432, dated November 24, 1868.

*To all whom it may concern:*

Be it known that I, LEWIS MILLER, of Akron, in the county of Summit and State of Ohio, have invented certain new and useful Improvements in Harvesting-Machines, and rakes therefor; and I do hereby declare the following to be a full, clear, and exact description of the same, reference being had to the accompanying drawings, making a part of this specification, in which—

Figure 1:
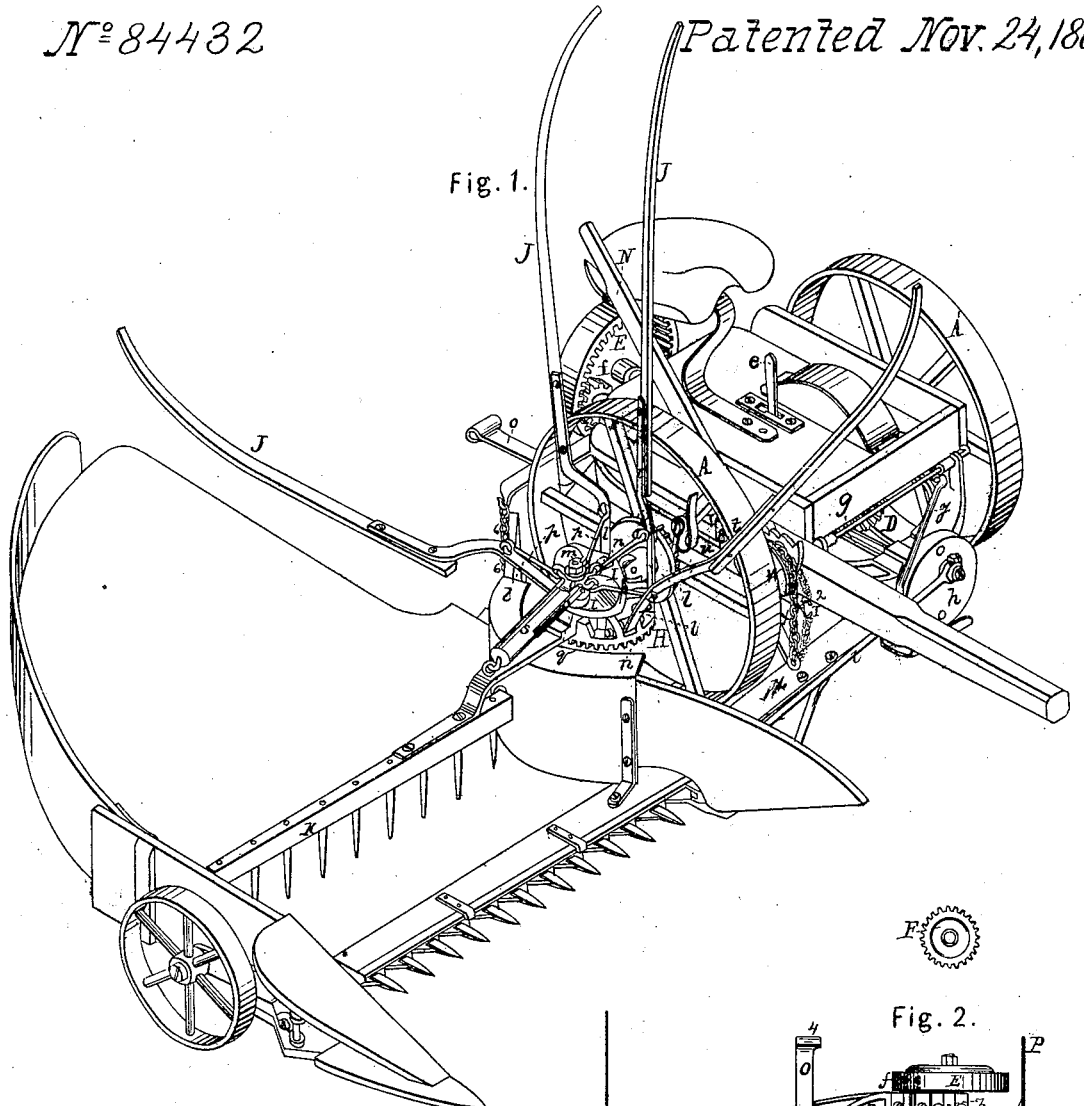
Figure 3:
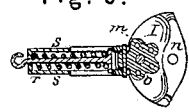
Figure 4:
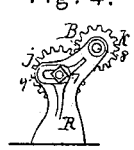
Figure 2:
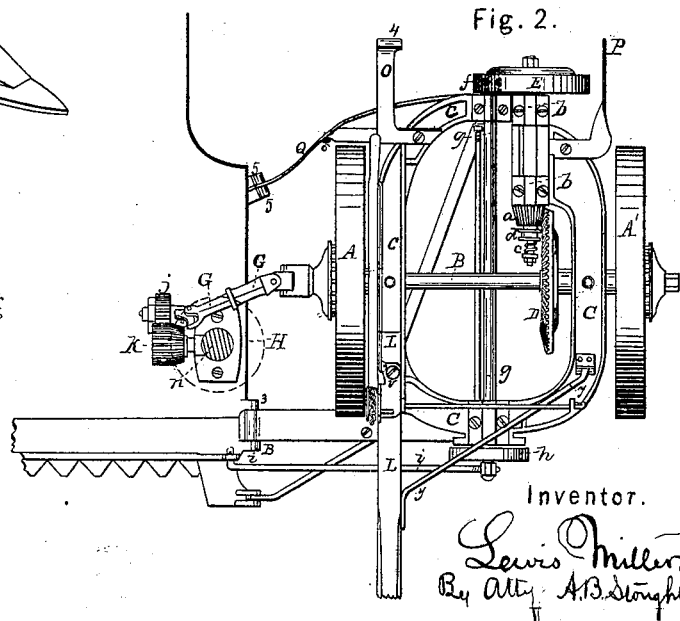

Figure 1 represents a perspective view of the harvesting-machine with the rake applied thereto. Fig. 2 represents a top plan of the main frame and driving-gear, the floor or cover being removed. Fig. 3 represents a top plan, partially in section, of a portion of the rake mechanism detached from the machine. Fig. 4 represents a detached view of the device for admitting of a change of gear for changing the speed of the rake and reel.

Similar letters of reference, where they occur in the separate figures, denote like parts in all of the drawings.

My invention consists, first, in a combination of devices by which a fast motion and a short stroke may be imparted to the cutters when mowing, and a slow motion and a long stroke when reaping.

My invention further consists in the manner in which I arrange the gears for driving the rake from the main drive-wheel or axle, so that a long coupling-connection can be used, and the speed of the rake changed by a change of pinion.

My invention further consists in a device by which the tongue can be made fast or loose, as occasion may require.

My invention further consists in a device for supporting and carrying the platform and cutting apparatus on the rear of the main frame, when the machine is being transported to or from the field.

My invention further consists in hanging the rake and beaters or reel-center eccentrically upon the gear that revolves them, so that the rake and beaters shall have their rising and falling and vertical and horizontal positions without the use of guides, ways, or cam-ledges.

My invention further consists in combining, with the rake of a combined rising and falling reel or beater and rake arrangement, a coiled spring for raising the rake after it has cleared the platform and passes beyond it.

To enable others skilled in the art to make and use my invention, I will proceed to describe the same with reference to the drawings.

The main drive-wheels A A' are loose on the main axle B; but when the machine is moving forward a pawl and ratchet connect them, so that they turn together. When backing the machine, or either one of the wheels, as in turning round, then the pawl slips over the ratchet, and no driving of the gearing is done.

The main frame is of cast-iron, and of an oval form, as seen at C, Fig. 2.

On the main axle B there is a bevel-gear, D, which, through the bevel-pinion $a$ on the shaft $b$, drives said shaft. The pinion $a$ is held in gear with the bevel-wheel D by the reaction of the coiled spring $c$ bearing against it, said spring working a clutch, $d$, that causes the pinion $a$ to turn with the shaft $b$; but when the clutch is moved away from the pinion by means of the clutch-lever $e$, Fig. 1, then, the pinion being loose on its shaft, it can run without turning the shaft.

On the rear end of the shaft $b$ there is an internal gear-wheel, E, or a cogged wheel, F, as shown over the top of Fig. 2, one or the other, as the case may be, or whether a faster or slower motion may be required. Either of said gears, when on the shaft, will work into a pinion, $f$, on the rear end of the shaft $g$, which shaft, running clear forward to the front of the machine, carries the crank-wheel $h$, from whence motion is given to the cutters through the pitman $i$. The wrist of the pitman $i$ on the crank-wheel can be set more toward or from the center of the wheel, so as to change the length of stroke of the cutters, this change occurring and being necessary when the speed is changed by the gears E or F for mowing or reaping, as will be hereinafter referred to.

From that end of the axle B or hub of the wheel A next to the platform a flexible or jointed coupling, G, extends to, and is connected with, a pinion, $j$, which it turns, and which pinion works into and turns a pinion, $k$, that gears into the bevel-cogs of the rake-moving gear H, which is supported (or rather its shaft) in a column or pillar, n, to which the shaft on which the pinion k turns is also fastened.

On the column or pillow-block, and above the rake-driving gear H, there is a stationary plate or piece, I, on which a journal or stud, m, Fig. 3, is fixed for the rake and beater-arms to revolve around, said stud being placed remote from or eccentric to the center of motion n of the rake-driving gear H. By having these two centers of motion m n, the beater-arms J are raised up into a vertical, or nearly so, position, to pass the main wheel, driver, &c., and without any cam-ledge to control them, and also to drop down in front to reel in the grain to the cutters. This is accomplished as follows: The beaters J are hinged to the driving-gear H by their bent shanks l, and, of course, they revolve with said wheel around its center n. On the other center, m, there is a plate, o, that revolves with the beaters, but around the center m, and to this plate the beaters are linked by rods p, that hook into dead-eyes on both the rake-shanks and in the plate o, and thus the beaters that reach out and drop to draw in the grain, and that pass at a comparatively low height above the cutters, are afterward, by the two centers m n, to which they are both connected, or by which they are influenced, raised up to pass the main frame without any cam-ledge or plane, but simply by the two centers and the link-motion connecting them.

The rake K is drawn and held down to its work of clearing the platform by means of a projection, q, on its shank, which takes under the stationary plate I, and which holds it down to the platform; but when the projection q passes out from under the stationary plate, then the recoil of the spring r in the cylinder or case s, which connects the rake to the plate o, and which spring was expanded by the rake being thus drawn down, raises up the rake into a vertical, or nearly so, position, to pass the main frame and driver mounted thereon, until again drawn down to perform the next raking operation.

To change the speed of the beaters and rake, the pinion j is changed for a larger or smaller one, as the case may be, and which is accomplished as follows, (see Fig. 4:) The post R supports the journals 7 8 of the gears j k, and the bearing of the journal 7 in the post is in a slot, 9, to admit of its adjustment to and from the journal of the gear k, which is a fixed journal. When a smaller gear is substituted for that of j the journal 7 is moved in the slot toward the gear k until the gears are in proper working position, and when a larger gear is substituted for the one j, then the journal is moved from the gear k far enough to allow of such working position. The long coupling G admits of this capacity to change the pinions, and further admits of a selection of location of the rake and beaters, without confining it to a plane with or close proximity to the axle or hub from whence it receives its driving motion.

In reaping, the tongue, as a general thing, is fast to the main frame. When mowing, it is better to have it loose. I provide for both contingencies by actually hinging the tongue to the main frame at t, Fig. 1, by using a stirrup, u, passing under the frame, to hinge to, and then, to make the tongue stiff or fast, I pass a screw-bolt, v, Fig. 2, through the tongue L into the main frame below, so that by inserting the bolt v the tongue is fast; remove it, and it is loose, or a hinged tongue. When the tongue is fast on the main frame, then the coupling-arm M is suspended to the arc w of the lever N by means of the chain x only, passing direct from one to the other; but when the tongue is loose, then the chain x, or another one, should extend from the coupling-arm M to a hook, 1, on the main frame, and also from the hook 2 on the main frame to the arc on the lever. By this connection the tongue can be loose, and still the lever N, which is on the tongue, can be used for raising and lowering or holding at any desired height the cutting apparatus. The tongue-brace y should be hinged to where it meets the main frame, to allow the tongue to play when used as a loose tongue.

On the rear of the main frame are two projecting arms, O P, which are designed for carrying the platform when going to or from the field. When the platform is to be so carried, the pin or bolt is drawn out from the coupling-bar M, as well as from the brace Q, and the pitman is unhooked. The platform is then so placed that the lugs 3 3 will take in the dead-eye 4 in the arm O, and the lugs 5 5 take in the end of the arm P. The pins or bolts may then be inserted, and they firmly hold the platform to the said arms. The brace Q is kept from dropping down by the chain 6, while the coupling-bar will be held up by its chain x.

Having thus fully described my invention, what I claim therein as new, and desire to secure by Letters Patent, is—

1. The combination of the changeable gears with the adjustable crank-wrist, so that a fast motion and short stroke, or a slow motion and a long stroke, may be given to the cutters, as the work to be done may require, substantially as described.

2. The arrangement of the gear-pinion j with regard to the pinion k and rake-driving gear H, so that a long coupling may be used, and a change of gear and change of speed attained or given to the rake, as and for the purpose described.

3. In combination with the device by which the tongue may be made fast or loose, the double hook 1 2, or its equivalent, by which the coupling-bar may be suspended to the main frame and to the lifting-lever by the same or another chain, x, as and for the purpose described.

4. In combination with a detachable platform, the rearwardly-projecting arms O P on the main frame, for connecting said platform to and carrying it upon when the machine is being transported to or from the field, or elsewhere, substantially as described.

5. Hanging the rake and beaters or reel and operating them upon or from two centers remote from each other, and to which they are connected, so that the beaters shall have their rising and falling and horizontal position without the use of guides, ways, or cam-ledges, substantially as described.

6. In combination with a combined rake and reel or beaters, having the motions herein described, the incased spring for raising the rake after it has cleared the platform, substantially as described.

L. MILLER.

Witnesses:
  A. B. STOUGHTON,
  EDMUND MASSON.